J. H. KOCH.
TIRE UPSETTING MACHINE.

No. 175,289. Patented March 28, 1876.

Witnesses.

Inventor:
John H. Koch
Edson Bros.
Attys.

N. PETERS, PHOTO-LITHOGRAPHER, WASHINGTON, D C.

UNITED STATES PATENT OFFICE.

JOHN H. KOCH, OF BUCYRUS, OHIO.

IMPROVEMENT IN TIRE-UPSETTING MACHINES.

Specification forming part of Letters Patent No. 175,289, dated March 28, 1876; application filed March 7, 1876.

*To all whom it may concern:*

Be it known that I, JOHN H. KOCH, of Bucyrus, in the county of Crawford and State of Ohio, have invented certain new and useful Improvements in Tire-Upsetting Machines; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1:
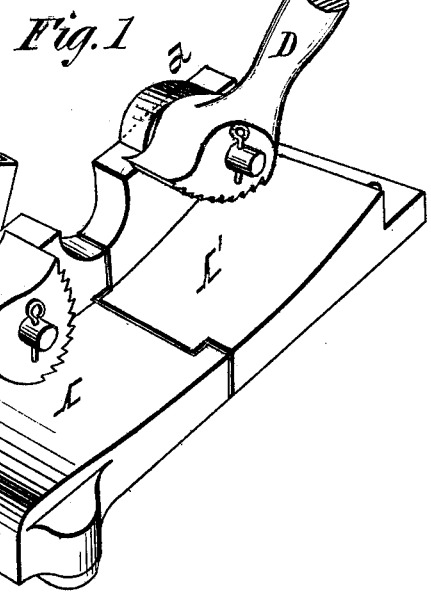
Figure 2:
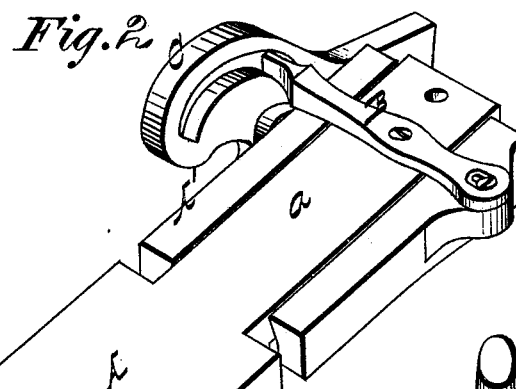
Figure 3:
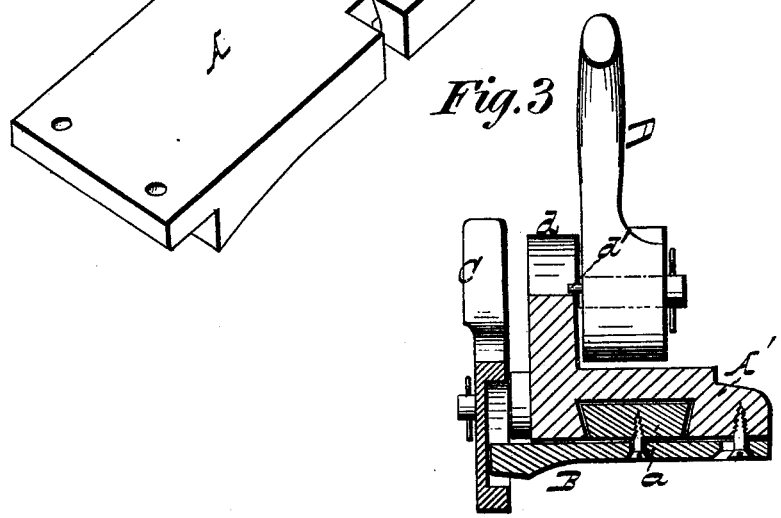

Figure 1 is a perspective view of my improved tire-upsetting machine; Fig. 2, an inverted view thereof, and Fig. 3 a transverse section of the same.

Corresponding parts in the several figures are denoted by like letters.

This invention relates to that class of tire-upsetting machines having a bisected bed, upon which the tire is clamped or held while being upset; and it consists, in the main, of mechanism for giving one of the sections of said bed a limited movement, and of the combination therewith of holding cam-levers, &c., substantially as hereinafter more fully set forth.

In the annexed drawing, A A' refer to a bisected bed, one of whose sections, A, is firmly bolted in position, and has an extension, $a$, upon which slides the other section, A'. This bed is dished or concaved upon its upper surface to adapt it to the convexity of the tire placed thereon to be upset. To the lower side of the extension $a$ of the section A is fulcrumed a lever, B, having one end connected to the sliding section A', as shown, or otherwise, and the other entering a cam-grooved lever, C, by moving which in one direction the bed is distended, or the section A' isolated from the section A. The bed, thus distended, is in readiness to receive the tire, which, when placed thereon, is held or clamped in position by the holding cam-levers D D, preferably serrated to promote their effectiveness. Move the lever C in the opposite direction, when the sliding section A' of the bed will approach the section A, causing the ends of the severed tire to meet and overlap for welding together, or upsetting, they having been previously heated to white-heat. The axes of the levers D D extend at right angles from vertical portions or uprights $d\ d$ of the bed-sections A A', and thus cause the said levers to occupy positions directly over the bed. Stops $d'$, projecting from the levers D D, limit their backward movement.

Having thus described my invention, what I claim, and desire to secure by Letters Patent, is—

1. The sliding bed-section A', in combination with the lever B, and cam-grooved lever C, substantially as and for the purpose set forth.

2. The bed A A', having the sliding section A', in combination with the levers B C, and holding cam-levers D D, substantially as and for the purpose set forth.

In testimony that I claim the foregoing as my own I hereunto affix my signature in the presence of two witnesses.

JOHN H. KOCH.

Witnesses:
G. DONNENWIRTH,
ADAM J. LICHTY.